US006651586B2

(12) United States Patent
Horth et al.

(10) Patent No.: US 6,651,586 B2
(45) Date of Patent: Nov. 25, 2003

(54) VIQUARIUM

(75) Inventors: Roland D. Horth, Blacksburg, VA (US); Joseph Lee, Glendale, CA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 0 days.

(21) Appl. No.: 10/094,892

(22) Filed: Mar. 11, 2002

(65) Prior Publication Data

US 2002/0148409 A1 Oct. 17, 2002

Related U.S. Application Data

(63) Continuation of application No. 08/865,688, filed on May 30, 1997, now abandoned.

(51) Int. Cl.⁷ ............................................. A01K 63/00
(52) U.S. Cl. .................................... 119/246; 119/253
(58) Field of Search ................. 119/245–248, 253–256; D30/101–107

(56) References Cited

U.S. PATENT DOCUMENTS

| | | | |
|---|---|---|---|
| 2,674,813 A | 4/1954 | Hutchinson | 434/152 |
| 3,059,091 A | 10/1962 | Wenzel | 119/256 |
| 3,815,547 A | 6/1974 | Willinger et al. | 119/259 |
| D243,964 S | 4/1977 | Deaton | 359/474 |
| 4,117,805 A | 10/1978 | Ward | 119/246 |
| 4,120,265 A | 10/1978 | Davis | 119/248 |
| 4,122,800 A | 10/1978 | Mangarell | 119/246 |
| 4,133,024 A | 1/1979 | Roehrick | 362/101 |
| 4,176,620 A | 12/1979 | Kassos | 119/246 |
| 4,606,821 A | 8/1986 | D'Imperio | 210/169 |
| 4,708,089 A | 11/1987 | Goldman et al. | 119/248 |
| 4,754,571 A * | 7/1988 | Riechmann | 119/246 |
| 4,788,938 A * | 12/1988 | Davenport | 119/246 |
| 4,958,593 A | 9/1990 | Hurlburt et al. | 119/246 |
| 4,995,334 A | 2/1991 | Wechsler | 119/246 |
| 5,000,118 A | 3/1991 | Merritt et al. | 119/246 |
| 5,005,521 A | 4/1991 | Strong | 119/246 |
| 5,056,463 A | 10/1991 | Wilkins et al. | 119/246 |
| 5,083,528 A | 1/1992 | Strong | 119/257 |
| 5,121,709 A | 6/1992 | Wechsler | 119/246 |
| 5,135,400 A | 8/1992 | Ramey | 434/297 |
| 5,172,650 A | 12/1992 | Hsu et al. | 119/259 |
| 5,183,004 A | 2/1993 | Trent et al. | 119/246 |
| 5,313,912 A | 5/1994 | O'Dell | 119/246 |
| 5,693,220 A | 12/1997 | Sceusa | 210/151 |
| 5,722,347 A * | 3/1998 | Tominaga et al. | 119/245 |
| 5,732,656 A * | 3/1998 | Tran | 119/254 |
| 6,029,605 A * | 2/2000 | Licata | 119/246 |
| 6,149,991 A * | 11/2000 | Okuda | 119/245 |

FOREIGN PATENT DOCUMENTS

| | | | | |
|---|---|---|---|---|
| CH | 681876 A5 | * | 6/1993 | A01K/1/03 |
| JP | 05168369 A | * | 7/1993 | A01K/63/00 |

* cited by examiner

*Primary Examiner*—Charles T. Jordan
*Assistant Examiner*—Kimberly S. Smith
(74) *Attorney, Agent, or Firm*—Merchant & Gould P.C.

(57) ABSTRACT

A molded structure which may be placed within a tank such as an aquarium to provide separate land and water areas which are capable of providing realistic and healthy living environments for fish, amphibians and reptiles. Preferably, the structure is molded such that it simulates realistic land and water environments. For example, the water area preferably provides the cliff and cave-like areas preferred by aquatic life. On the other hand, the interface between the land and water portions is preferably sloped in portions to provide an amphibian friendly surface, while the land area may include depressions for the maintenance of plant life. In the preferred embodiment, the back and underside of the unit is hollow to incorporate a filter media, pump, heater, additional aeration device or any other such desired apparatus. In an especially preferred embodiment, small openings are provided along the base to allow water to be drawn through the gravel in front of the unit to provide additional filtration.

26 Claims, 5 Drawing Sheets

US 6,651,586 B2

VIQUARIUM

This is a continuation of application No. 08/865,688, filed May 30, 1997 now abandoned.

FIELD OF THE INVENTION

The present invention relates to viquariums and, in particular, to a structure which may be employed to create a viquarium.

BACKGROUND OF THE INVENTION

Aquariums and terrariums have long been used for decorative and informational purposes. Aquariums provide an opportunity for individuals to maintain and observe various forms of aquatic life on a daily basis. Terrariums, on the other hand, provide an opportunity to view terrestrial plant and animal life. A drawback of each, however, is that each is unable to support the life of the other for any length of time. Terrestrial life cannot survive in the environment of an aquarium just as aquatic life cannot survive in a terrarium. In addition, amphibious life, which requires both land and earth to survive, is unable to thrive solely in an aquarium or in a terrarium.

Viquariums, also know as vivariums or aquaterrariums, consist of a container such as a tank with both an aquarium portion and a terrarium portion and provide an opportunity to support and observe aquatic, terrestrial and amphibious life. A number of patents discuss various forms of viquariums. For example, U.S. Pat. No. 4,117,805 discloses a vivarium in which the aquarium and the terrarium chambers are separated by an expansion chamber for refilling and circulating the aquarium water. U.S. Pat. No. 4,176,620 discloses a vivarium in which the terrarium floor is affixed to one wall of the tank such that the floor extends outward over the aquarium portion. Further, U.S. Pat. No. 5,183,004 discloses a self-contained ecosystem in which an aquarium portion rests upon a cabinet and a terrarium portion exists above the aquarium.

A major drawback of such pre-existing viquariums is that they do not provide the user with an alternative by which he or she may utilize their current aquarium as a viquarium. As millions of aquariums are currently in use, it would be inefficient, inconvenient and costly for the owner of an aquarium to purchase a new tank for a viquarium instead of being able to convert their existing aquarium into a viquarium. Another drawback of viquariums is that all rely on separate, external filtration as a means for cleaning the water. A further drawback is that most present systems disclose large, bulky units which would not be capable of use in the commonly utilized smaller tanks, such as ten gallon size tanks. It would, therefore, be desirable to provide a structure which may be placed within a tank, and especially a relatively small tank, to allow a user to construct a viquarium.

SUMMARY OF THE INVENTION

The present invention features a molded structure which may be placed within a tank such as an aquarium to provide separate land and water areas which are capable of providing realistic and healthy living environments for fish, amphibians and reptiles. Preferably, the structure is molded such that it simulates realistic land and water environments. For example, the water area preferably provides the cliff and cave-like areas preferred by aquatic life. On the other hand, the interface between the land and water portions is preferably sloped in portions to provide an amphibian friendly surface, while the land area may include depressions for the maintenance of plant life. In the preferred embodiment, the back and underside of the unit is hollow to incorporate a filter media, pump, heater, additional aeration device or any other such desired apparatus. In an especially preferred embodiment, small openings are provided along the base to allow water to be drawn through the gravel in front of the unit to provide additional filtration.

DETAILED DESCRIPTION OF THE PREFERRED EMBODIMENTS

The embodiments of the present invention are designed to create a viquarium which provides a realisic and healthy habitat for terrestrial, aquatic and amphibious life.

Figure 1:
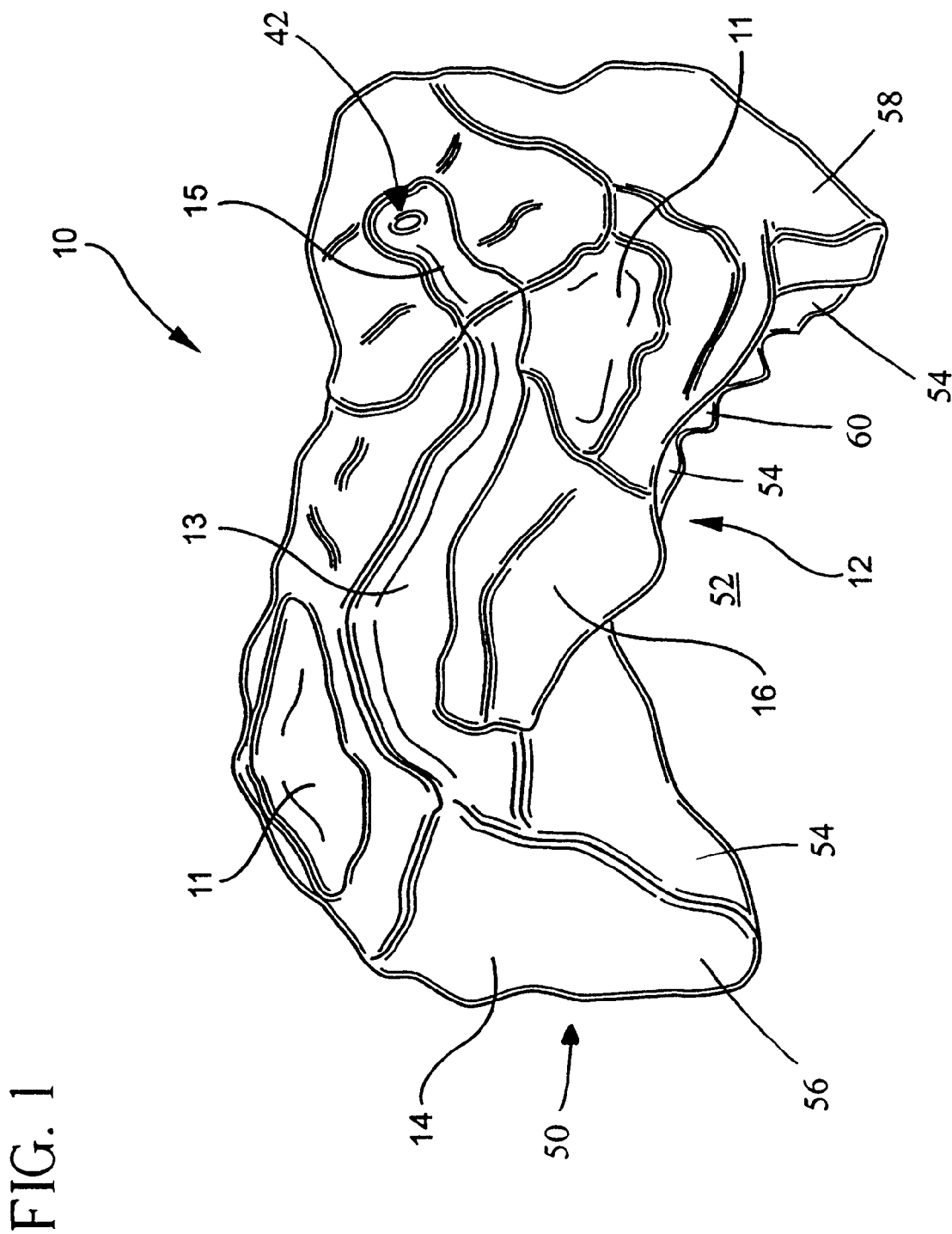
FIG. 1 is a perspective view of the viquarium.

As illustrated in FIG. 1, a viquarium structure 10 is provided which is capable of providing a complex living environment and a complete ecosystem in a minimum of space. The structure is preferably molded from a water proof material such as polyester resin in a shape which simulates a realistic structure. The shape and size of the structure may vary as desired, however a preferred embodiment comprises a structure which is sufficiently small for placement within a ten gallon tank. The structure may be molded into a shape which provides different habitats or living areas. Preferred living areas, as illustrated in FIG. 1, include one or more depressed areas 11 which may function as planters for plant life or as ponds, and a cave region or cave-like area 12 for fish. In addition, other features may be incorporated to provide a realistic environment setting. Included in these other features are a water return means 42, and a cliff 14.

Figure 2:
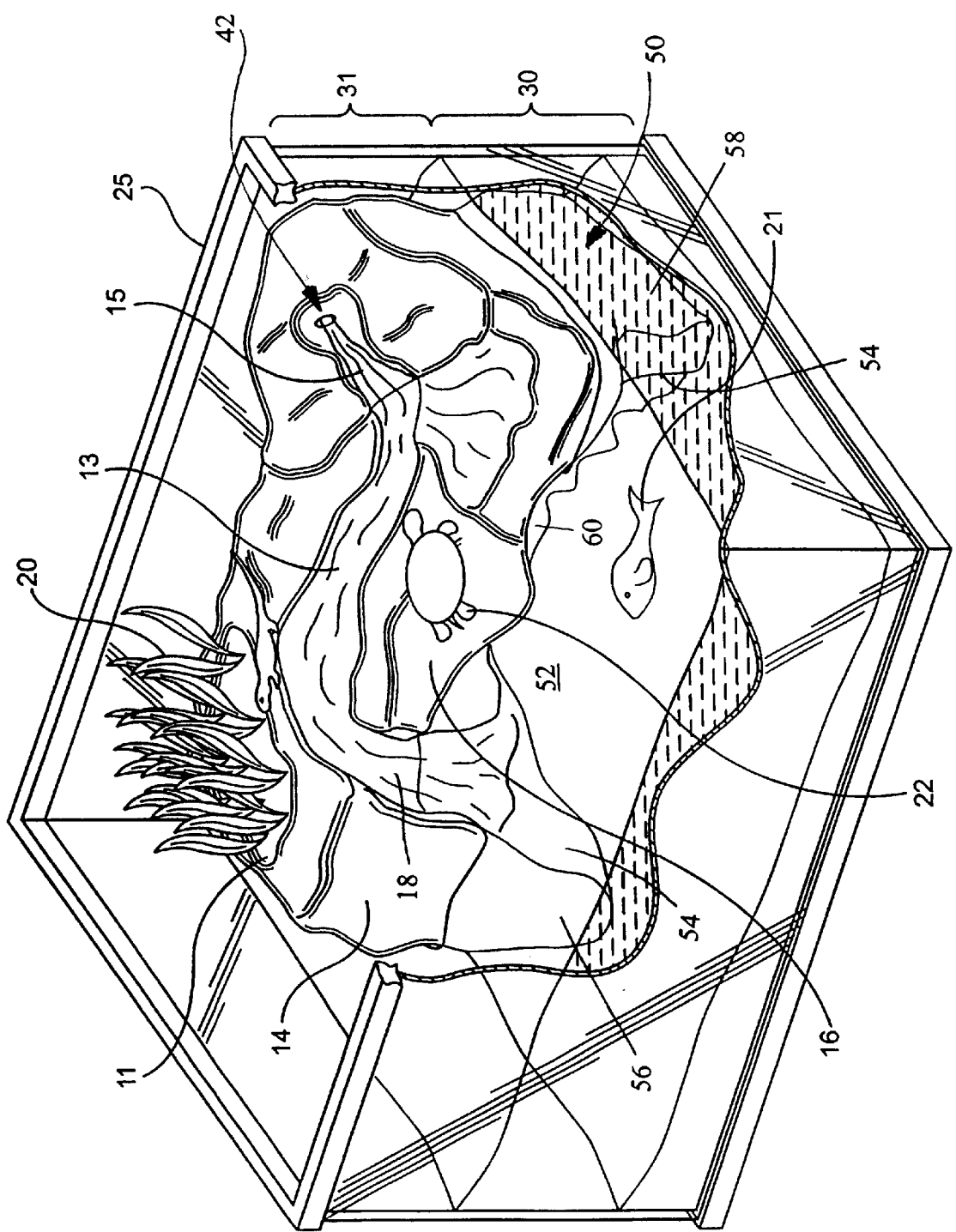
FIG. 2 is a perspective view of the viquarium as placed within a tank and containing plant and animal life.

As illustrated in FIG. 2, the viquarium structure 10 is utilized within a tank 25 to form a complete ecosystem. First, the base of the tank is prepared by placing gravel or another suitable base material along the bottom of the tank. Next, the viquarium structure is placed on the base material within the tank. Water is then introduced into the tank with the result being that an under water portion 30 of the viquarium structure is submerged and a land portion 31 is above the water line. In land portion 31 which is above the water line, depressed areas 11 form a location for the existence of plant life 20. A wide variety of porous fill materials, such as sand, gravel, soil, fertilizer, rocks or any combination thereof, may be placed in the depressed areas to provide support for the plant life. Any plants located in this portion of the structure provide the additional benefit of aiding in the final removal of nitrates from the system. Also located on land portion 31 are the water return means 42, which aid in providing the proper environment for aeration and filtration. In the preferred embodiment, the return means 42 are in the form of a waterfall 15 and a channel 13 which allows for the simulation of a stream 18. Preferably, a porous fill material, such as gravel, is used as the base for the stream. The porous fill material is important because gravel acts as a biological filter; bacteria grow on gravel and the movement of the water over the gravel converts toxic ammonia first into nitrite and then into nitrate. A sloped, amphibian-friendly shoreline 16 may also be provided at the interface of land portion 31 and under water portion 30 in order to provide easy access and egress to and from the water for amphibians and other animals 22, such as turtles, which thrive in both aquatic and terrestrial environments. Cliffs 14 may also be provided extending over the entire height of the viquarium structure to provide a good habitat for arboreal reptiles. In the under water portion 30, structures such as a cave-like area 12 may be provided to aid in the raising and keeping of fish 21.

The under water portion 30 includes a wall construction 50 that extends downward from the land portion 31. The wall construction 50 includes an opening 52. The opening 52 defines an entrance into the cave-like area 12 formed in the wall construction 50 of the under water portion 30. Specifically, the cave-like area 12, or cave region, is defined by the opening 52 and an interior wall surface 54 of the wall construction 50.

The opening 52 is sized and configured such that fish 21, for example, can enter and exit the cave-like area 12. The opening 52 has an opening area. Likewise, the interior wall surface 54 of the wall construction has a wall surface area. The opening area is less than the wall surface area of the interior wall surface 54. This cave-like area 12, i.e. the area surrounded by the wall construction 50 having an opening 52, is provided to aid in raising and keeping the fish 21.

In the illustrated embodiment, the wall construction 50 includes only a single opening 52 sized and configured for the keeping of fish 21. Generally, the wall construction 50 includes a first wall 56, a second wall 58 opposing the first wall 56, and a back wall 60. The opening 52 is defined between the first and second opposing walls 56, 58.

Figure 3:
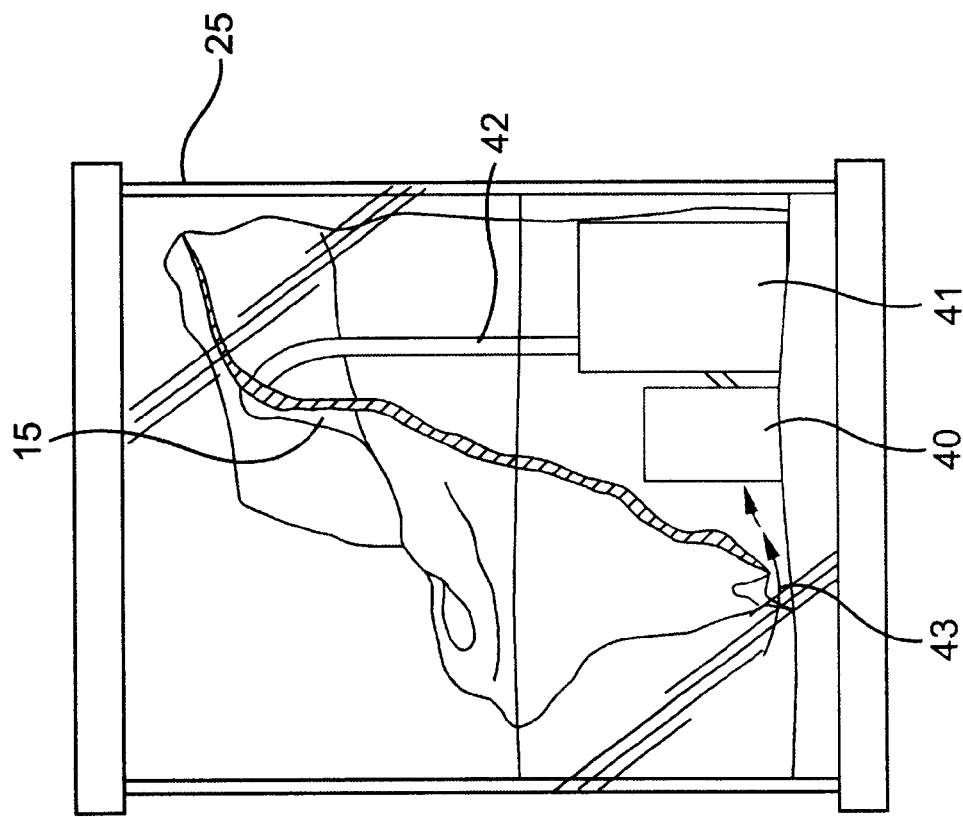
FIG. 3 is a side view of the viquarium.

As illustrated in FIG. 3, the back of the viquarium structure is preferably hollow. The hollow back of the structure allows for the incorporation of a filter media 40 and/or pump means 41 within the structure. In the preferred embodiment, a plurality of small openings or scallops 43 are provided in the base of the structure to allow water to be drawn through the gravel in front of the unit and then on into the filter media. The water is then pumped from the filter through return means 42 which are provided to return the water from the pump up to the surface of the structure. Preferably, the water is returned to the system via the waterfall 15 located on the upper portion of the structure and the channel 13. The internal filtration system provided by the placement of the filter within the hollow back of the structure provides the advantage of eliminating leakage from external filtration in that no potentially leaky holes must be drilled through the tank for filtration to occur. Especially preferred for thorough filtration and ease of maintenance is a filter which employs BIO-BAG disposable filter cartridges as manufactured by TETRA/SECOND NATURE, Blacksburg, Va.

Figure 4:
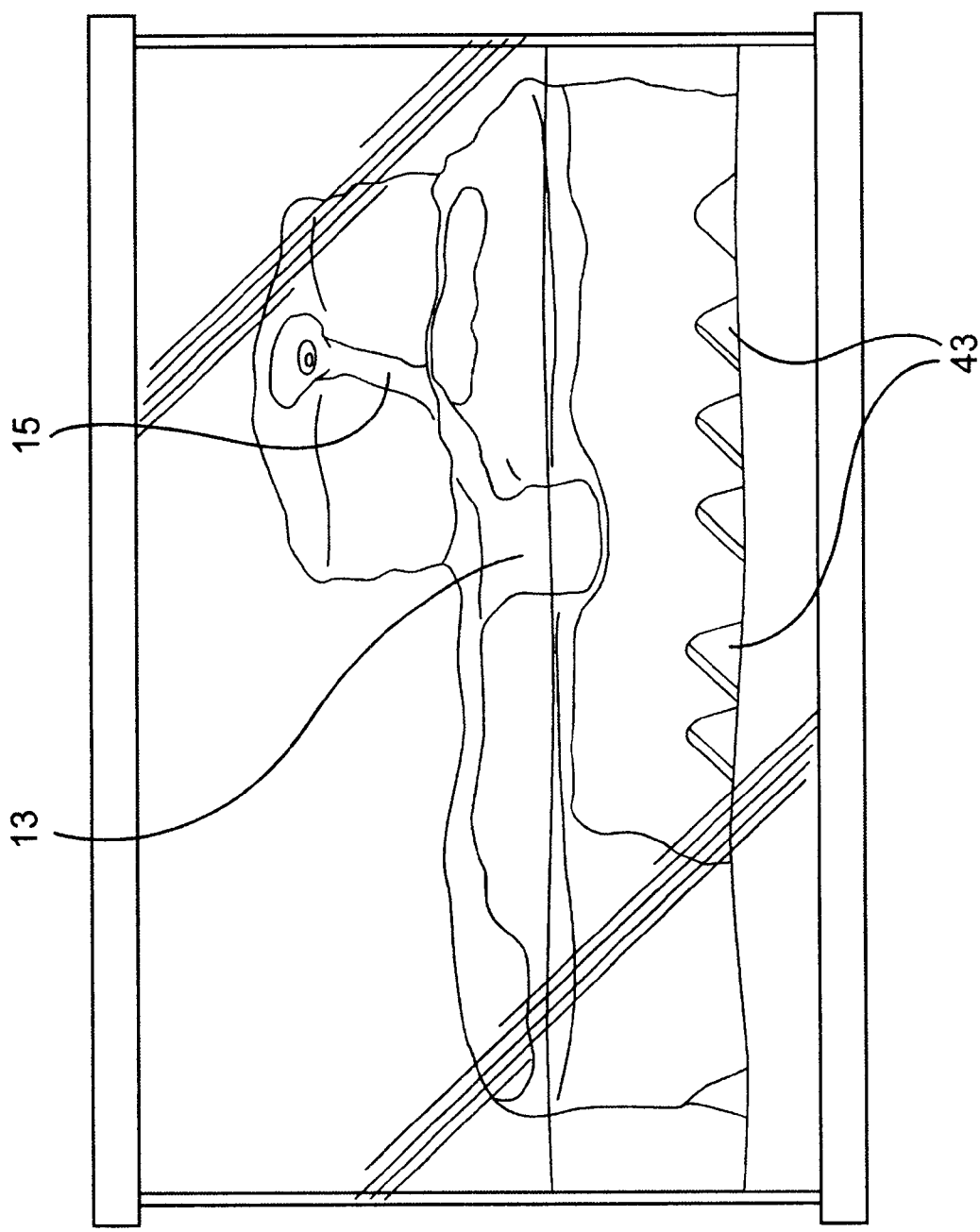
FIG. 4 is a front view of the viquarium.
Figure 5:
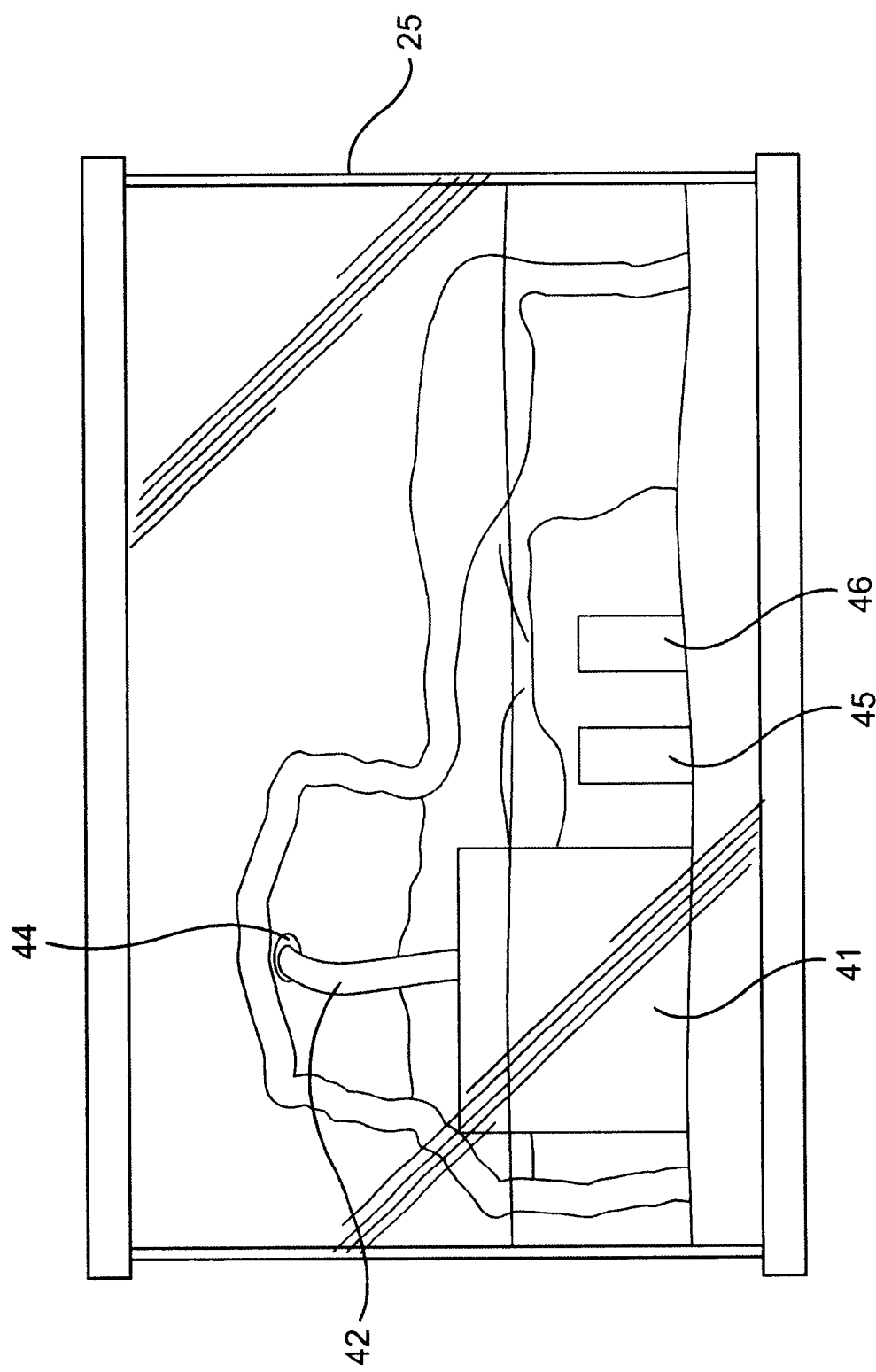
FIG. 5 is a back view of the viquarium.

FIGS. 4 and 5 further illustrate the utilization of the structure. As shown in FIG. 4, openings 43 allow water to pass into the hollow portion in the back of the structure. As shown in FIG. 5, water flows from the pump means 41 through water return means 42, preferably in the form of a tube or pipe, up to hole 44 and back into the system. Optional items, such as heater 45 and aeration device 46 may also be placed in the hollow area in the back of the structure.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

We claim:

1. A structure for placement within a container configured to simulate a realistic environment for terrestrial, aquatic and amphibious life, the structure comprising:
   a) a land portion including a return means for returning water to the land portion; and
   b) an underwater portion, the underwater portion including:
      i) a wall construction extending downward from the land portion, the wall construction having a bottom edge configured to contact a bottom of the container, and an inner wall surface area;
      ii) a cave region defined by the inner wall surface area of the wall construction and an opening formed in the wall construction, the opening having an opening area sized for entrance into the cave region, the opening area being less than the inner wall surface area of the wall construction; and
      iii) at least one secondary opening formed along the bottom edge of the wall construction when said botton edge is in contact with the botton of the container.

2. A structure according to claim 1, wherein the structure is molded from a water proof material.

3. A structure according to claim 2, wherein the structure is molded from polyethylene resin.

4. A structure according to claim 3, wherein the molded structure has a hollow back portion.

5. A structure according to claim 1, wherein the underwater portion includes only a single opening being and configured for entrance into the cave region, when the wall construction is placed in contact with the bottom of the container.

6. A structure according to claim 1, wherein the return means comprise a waterfall and a channel.

7. A structure according to claim 6, wherein the land portion further comprises one or more cliff regions and a sloped shoreline area.

8. A structure according to claim 1, wherein the wall construction includes a first wall, a second wall opposing the first wall, and a back wall extending between the first and second walls, each of the first, second, and back walls extending from the land portion and configured to contact the bottom of the container when the structure is placed within the container.

9. A structure according to claim 8, wherein the opening formed in the wall construction is defined by the first and second opposing walls.

10. A structure according to claim 1, wherein the structure includes a plurality of secondary openings formed along the bottom edge of the wall construction, the secondary openings permitting water to be drawn through gravel for filtration purposes when gravel is provided on the bottom of the container.

11. A structure according to claim 8, wherein the secondary opening is formed along the bottom edge of the back wall of the wall construction.

12. A viquarium configured to simulate a realistic environment for terrestrial, aquatic and amphibious life, the viquarium comprising:
   a) a container having sides and a bottom;
   b) a structure positioned within the container, the structure including:
      i) a land portion including a return means for returning water to the land portion; and ii) an underwater portion, the underwater portion including:
  1) a wall construction extending downward from the land portion and configured to contact the bottom of the container, the wall construction having an inner wall surface area;
  2) a cave region defined by the inner wall surface area of the wall construction and an opening formed in the wall construction, the opening having an opening area sized for entrance into the cave region, the opening area being less than the inner wall surface area of the wall construction; at least one scalloped opening formed in the wall construction and positioned adjacent to a region of the wall construction contacting the bottom of the container.

13. A viquarium according to claim 12, wherein the structure is molded from a water proof material.

14. A viquarium according to claim 13, wherein the structure is molded from polyethylene resin.

15. A viquarium according to claim 13, wherein the molded structure has a hollow back portion.

16. A viquarium according to claim 15, wherein the hollow back portion contains one or more items from the group consisting of aquarium filters, pumps, aquarium aeration devices and aquarium heaters.

17. A viquarium according to claim 12, wherein the return means comprise a waterfall and a channel.

18. A viquarium according to claim 17, wherein the land portion further comprises one or more cliff regions and a sloped shoreline area.

19. A viquarium according to claim 12, wherein the container is an aquarium tank.

20. A viquarium according to claim 19, wherein the aquarium tank is a ten-gallon tank.

21. A method for creating a viquarium, comprising the steps of:
  a) placing a hollow structure which simulates a realistic environment for terrestrial, aquatic and amphibious life in a container, the hollow structure including a land portion and an underwater portion, the underwater portion including a wall construction, a plurality of scalloped openings formed in the hollow structure, and a cave region, the cave region being defined by the wall construction and an opening formed in the wall construction;
  b) positioning the hollow structure such that the wall construction contacts a bottom surface of the container.

22. A method for creating a viquarium according to claim 21, comprising the additional step of providing a suitable base on the bottom surface of the container.

23. A method for creating a viquarium according to claim 22, comprising the additional step of placing filtration and pump means within the structure.

24. A method for creating a viquarium according to claim 22, comprising the additional step of placing heating or aeration means with the structure.

25. A structure according to claim 23, comprising the additional step of drawing water through the plurality of scalloped openings to the filtration and pump means.

26. A method for creating a viquarium according to claim 25, comprising the additional step of drawing water through the suitable base, through the plurality of scalloped openings and to the filtration and pump means.

* * * * *

UNITED STATES PATENT AND TRADEMARK OFFICE
CERTIFICATE OF CORRECTION

PATENT NO. : 6,651,586 B2
DATED : November 25, 2003
INVENTOR(S) : Horth et al.

It is certified that error appears in the above-identified patent and that said Letters Patent is hereby corrected as shown below:

<u>Column 4,</u>
Line 32, "opening being and" should read -- opening being sized and --.

<u>Column 5,</u>
Line 12, insert a new paragraph after "wall construction;" should read -- 3) at least one --.

Signed and Sealed this

Twentieth Day of September, 2005

JON W. DUDAS
*Director of the United States Patent and Trademark Office*